Figure 1:
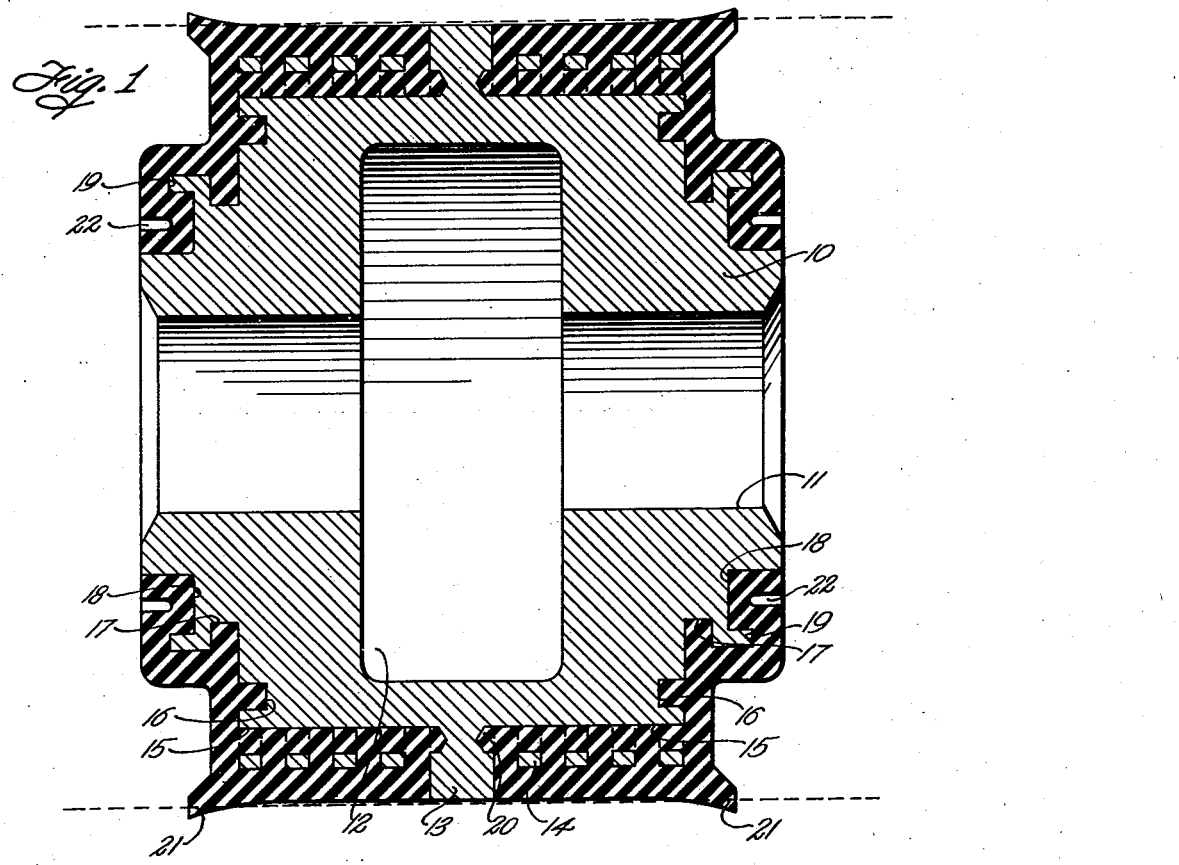

June 23, 1942.    E. E. MILLER    2,287,483
MUD PUMP PISTON
Filed Feb. 27, 1940    2 Sheets-Sheet 2

Inventor
ERWIN E. MILLER
By Hazard and Miller
Attorneys

Patented June 23, 1942

2,287,483

UNITED STATES PATENT OFFICE 2,287,483

MUD PUMP PISTON

Erwin E. Miller, Fullerton, Calif.

Application February 27, 1940, Serial No. 321,061

9 Claims. (Cl. 309—4)

This invention relates to improvements in mud pump pistons and may be considered as an improvement over the construction disclosed in my pending application Serial No. 241,491, filed November 21, 1938, since matured into United States Patent No. 2,189,349, issued February 6, 1940.

Mud pump pistons in accordance with present well drilling practices have extremely heavy pressures or loads imposed upon them. A popular design of piston has a steel body equipped with a central flange designed to snugly fit the interior of the liner which provides the walls of the cylinder within which the piston reciprocates. On opposite sides of this central flange there is molded rubber intended to sealingly engage the walls of the liner. Under the extreme loads to which mud pump pistons are now subjected a number of problems are presented in connection with the attachment of the rubber portions of the piston. It has been proposed to form a part of the rubber of soft rubber composition and the balance of hard rubber. This proposal meets with certain difficulties in that the curing times for hard and soft rubber compositions are different, and in order to compensate for the difference in the natural curing times, ingredients detrimental to the rubber must be added. In this way, although it is possible to cure the hard and soft rubber in the mold by the application of the same heat to both compositions for the same period of time, one composition is very apt to be detrimentally affected.

It consequently is preferred to have the rubber composition on the piston uniform throughout. When the rubber composition is of soft rubber, which is desirable, certain problems are presented. If the rubber is in the form of a large compressible mass it is apt to become worked over the periphery of the central flange regardless of the fact that the central flange on the body fits the interior of the liner quite closely. To prevent this taking place adequate reinforcement should be present in the rubber adjacent its periphery to hold it in proper position even when it is subjected to high pressures tending to distort it.

Other problems presented relate to the danger of the rubber being peeled or separated from the steel body under the high pressure operating conditions and also relate to the danger of fluid pressure leaking or being forced between the rubber and the steel body of the piston.

It is an object of the present invention to provide an improved mud pump piston wherein the rubber may be of uniform composition throughout and adequately reinforced adjacent its periphery to hold it in place regardless of its being subjected to high distorting pressures.

Another object of the invention is to provide a mud pump piston having the above-mentioned characteristics which is so designed that the rubber will be held against separation from the steel body at the points or localities where it is subjected to the greatest separating effects or tendencies.

Still another object of the invention is to provide an improved mud pump piston having the above characteristics wherein adequate provision is made to prevent leakage between the rubber and the steel body of the piston.

A further object of the invention is to provide an improved mud pump piston which is relatively simple to manufacture and which when manufactured, will be highly durable even under extremely high mud pump pressures.

Figure 2:
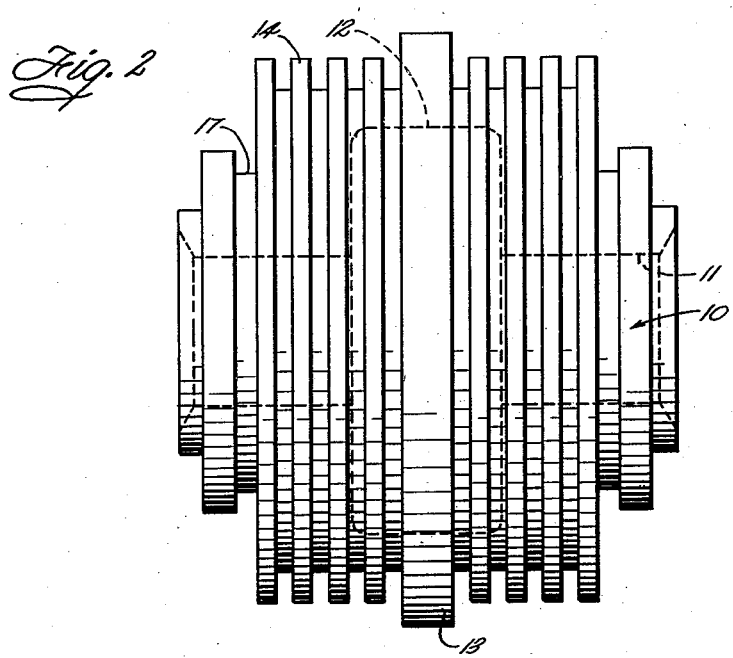
Figure 3:
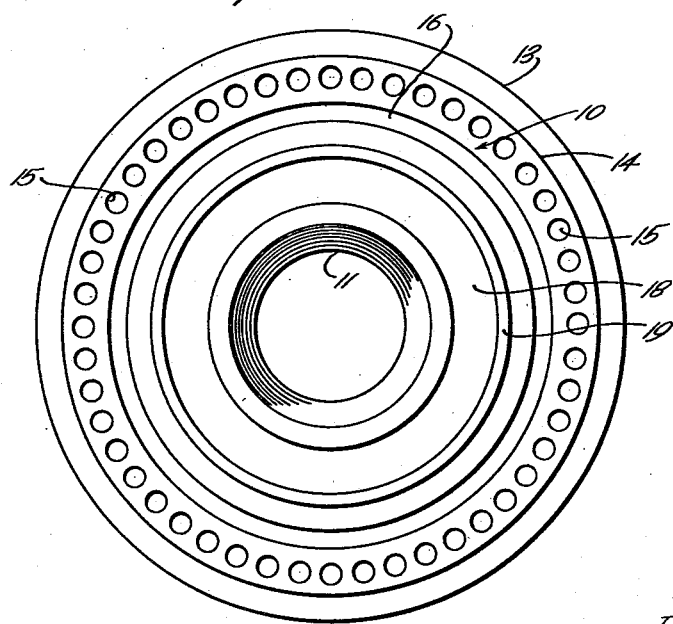

With the foregoing and other objects in view, which will be made manifest in the following detailed description and specifically pointed out in the appended claims, reference is had to the accompanying drawings for an illustrative embodiment of the invention, wherein:

Figure 1 is a longitudinal vertical section through the improved mud pump piston embodying the present invention; and Fig. 2 is a view in side elevation of the body of the piston prior to the application of the rubber thereto; and Fig. 3 is a view in end elevation of the body of the piston illustrated in Fig. 2.

Referring to the accompanying drawings wherein similar reference characters designate similar parts throughout, the improved piston is preferably made from a one-piece steel casting 10 having a central longitudinal hole 11 formed therein for the reception of the piston or plunger rod of the mud pump. The body of the piston may be cored out as indicated at 12 to reduce its weight. Although it is highly desirable to manufacture the body of the piston from one piece it will be understood that the present invention is not necessarily restricted thereto and there may be certain occasions where it is desirable to form the body of a plurality of pieces.

The body is equipped with a central flange 13, the periphery of which is machined and preferably ground so as to snugly fit the interior of the mud pump liner which provides the cylinder walls for the pump. On opposite sides of this central flange 13 the body is of reduced diameter and is first machined or otherwise formed to provide a series of separated peripheral flanges 14. These flanges are rather closely arranged with their diameter smaller than that of the central flange 13 equal to the thickness of the rubber that is to be applied. These flanges, after they are formed, are longitudinally drilled forming a series of apertures or perforations 15. In the preferred form of construction the drill not only passes through all of the flanges 14 but in addition penetrates the sides of the central flange 13. In this way the body has on opposite sides of the central flange 13 a series of spaced perforated smaller flanges.

On the end faces of the body there are formed grooves 16, 17, and 18, respectively. The grooves 16 and 17 which are arranged outermost are arranged at approximately right angles to each other while the groove 18 is made quite wide and is arranged parallel to and within the outer groove 16. The grooves 17 and 18 may be regarded as being separated by an angular flange 19 formed on each end of the piston body.

With the body thus formed soft rubber stock or molding composition is applied thereto. This is applied around the smaller flanges 14 and between them and enters through the perforations 15 formed therein. The rubber is also caused to enter into the recesses formed on the sides of the central flange 13 as indicated at 20 and is applied on the ends of the piston body entering and filling the grooves 16 and 17. It also enters and fills the groove 18. When the rubber stock is thus applied, the piston is in condition to be placed into a curing mold in which it is heated and the rubber vulcanized. The mold is such as to form outwardly flaring lips 21 on the rubber adjacent the corner edges of the piston. These lips are intended to be somewhat flexible and to form a tight resilient sealing engagement with the walls of the liner. The mold also serves to core out or form a groove 22 in that portion of the rubber that is disposed within groove 18.

When the rubber stock has been vulcanized or cured the piston is removed from the mold and is ready for use. With the piston embodying the above construction the following advantages are present. While there is soft rubber on opposite sides of the central flange 13 this rubber is effectively held in place against serious distortion under high mud pump pressures by the reinforcing effect of the perforated flanges 14. The rubber being molded about, between, and through these flanges is adequately reinforced against distortion and against radial or longitudinal separation from the body of the piston. Those portions indicated at 20 which penetrate and fill the recesses on the sides of the central flange assist in retaining the rubber adjacent the central flange from moving radially outward. The portions of the rubber which enter the grooves 16 likewise lock the rubber against outward radial movement while the portions that fill the grooves 17 lock the rubber against separation from the steel body during intake or suction strokes. The rubber disposed within groove 18 is designed to be expanded by the pressure transmitted to its interior through groove 22. This portion of the rubber being highly expanded against the interior of groove 18 serves to prevent leakage of fluid pressure between the rubber and the steel of the body, thus leakage beneath the rubber or around the angular flange 19, and thence around the rubber in grooves 17 and 16 over to the central flange is effectively prevented.

It will thus be appreciated that with the improved construction it is quite feasible to make a very sturdy piston using rubber of uniform composition and yet to adequately reinforce it so that it will not become unduly distorted under high pressures nor loosened from the piston body. In addition thereto, leakage behind the rubber is effectively prevented resulting in a piston capable of a very long life even under highly severe conditions.

Various changes may be made in the details of construction without departing from the spirit or scope of the invention as defined by the appended claims.

I claim:

1. A mud pump piston having a body equipped with a central flange, the periphery of which is adapted to engage the walls of a mud pump liner, there being spaced perforated flanges on the body on each side of the central flange of substantially uniform diameter, and rubber molded about and between the flanges and through the perforations therein, the rubber outwardly of the flanges being of substantially uniform thickness.

2. A mud pump piston having a body equipped with a central flange, the periphery of which is adapted to engage the walls of a mud pump liner, there being spaced perforated flanges on the body on each side of the central flange of substantially uniform diameter, and rubber molded about and between the flanges and through the perforations therein, the periphery of the rubber being substantially flush with the periphery of the central flange and being of substantially uniform thickness outwardly of the flanges.

3. A mud pump piston having a body peripherally of which is formed a plurality of spaced perforated flanges, and rubber molded about and between the flanges and through the perforations therein, there being grooves formed on the ends of the body, said grooves being arranged at substantially right angles to each other, and the rubber extending over the ends of the body and filling said grooves.

4. A mud pump piston having a body equipped with a central flange, the periphery of which is adapted to engage the walls of a mud pump liner, there being spaced perforated flanges on the body on each side of the central flange, and rubber molded about and between the flanges and through the perforations therein, there being grooves formed on the ends of the body, said grooves being arranged at substantially right angles to each other and the rubber extending over the ends of the body and filling said grooves.

5. A mud pump piston having a body equipped with a central flange, the periphery of which is adapted to engage the walls of the mud pump liner, there being spaced perforated flanges on the body on each side of the central flange, and rubber molded about and between the flanges and through the perforations therein, there being grooves formed on the ends of the body, said grooves being arranged at substantially right angles to each other and the rubber extending over the ends of the body and filling said grooves, and a third groove on each end of the body arranged inwardly of the mentioned grooves into which a portion of the rubber extends.

6. A mud pump piston having a body equipped with a central flange, the periphery of which is adapted to engage the walls of the mud pump liner, there being spaced perforated flanges on the body on each side of the central flange, rubber molded about and between the flanges and through the perforations therein, there being grooves formed on the ends of the body, said grooves being arranged at substantially right angles to each other and the rubber extending over the ends of the body and filling said grooves, and a third groove on each end of the body arranged inwardly of the mentioned grooves into which a portion of the rubber extends, the portion of the rubber extending into the third groove being itself grooved so as to be capable of being expanded by fluid pressure to prevent leakage.

7. A mud pump piston having a body equipped with a central flange, there being spaced perforated flanges of substantially uniform thickness on the body on each side of the central flange, the sides of the central flange being recessed, and rubber molded about and between the flanges and through the perforations therein, and in the recesses on the sides of the central flange.

8. A mud pump piston having a body on the ends of which are arranged two grooves, said grooves being arranged at approximately right angles to each other, rubber molded onto the body extending over the ends of the body and filling said grooves.

9. A mud pump piston having a body on the ends of which are arranged two grooves, said grooves being arranged at approximately right angles to each other, rubber molded onto the body extending over the ends of the body and filling said grooves, there being a third groove on each end of the body within the mentioned grooves, and the rubber extending into the third groove and being itself grooved therein.

ERWIN E. MILLER.